May 4, 1937.  P. D. KEMP  2,079,175

DIRECTIONAL INDICATOR FOR MOTOR VEHICLES

Filed April 18, 1936

INVENTOR
Paul D. Kemp
BY
ATTORNEY

Patented May 4, 1937

2,079,175

UNITED STATES PATENT OFFICE 2,079,175

DIRECTIONAL INDICATOR FOR MOTOR VEHICLES

Paul D. Kemp, Portland, Oreg.

Application April 18, 1936, Serial No. 75,126

1 Claim. (Cl. 116—31)

My invention relates to steering indicators for motor vehicles.

Heretofore the driving of an automobile in a forward direction, in a straight line, or in a reverse direction in a straight line, has been difficult of attainment. With the high speeds at which vehicles are now being driven either in a forward or in a reverse direction steering is still more difficult.

The primary purpose and object of my invention is to provide an indicator that will indicate the precise position of the front wheels relative to that of the steering wheel whether the vehicle is being driven in a forward direction or in a reverse direction. I also provide an indicator for indicating the precise position of the front wheels of the vehicle whether the same are cramped to their full capacity at either side of the frame. To accomplish this result I place an indicator at the forward end of the vehicle as upon the radiator or the top of the casing of the radiator and upon the cowl or the dash of the vehicle. The one upon the front end of the vehicle and the one upon the dash, cowl or windshield being parallel to the longitudinal axial alignment of the frame of the vehicle.

I place a removable shield or sleeve upon a portion of the steering wheel of the vehicle. The central position of the sleeve has a central mark and graduations are disposed at either side of the central position. I preferably graduate the sleeve with the spacing of the graduations uniformly increasing from the center toward the ends. The center of the graduation is placed in registry alignment with the markings or lines placed upon the line of the windshield, dash or the cowl of the vehicle and in registry alignment with the marking placed upon the casing or top of the radiator to thereby provide a three-point alignment to enable the operator of the vehicle to precisely note the position of the front wheels of the vehicle at all times. The sleeve to be placed upon the rim of the steering wheel is adjustable.

The steering wheel of motor vehicles has a number of spokes disposed therein with the tendency being three in number to provide a clear field over which the tall driver may look and between the spokes and the inside of the rim through which the vision of the short driver looks to thereby provide steering facilities that facilitates the driver of the vehicle precisely knowing the position of the front wheels of the vehicle.

I have also observed that in most of the vehicles today the turn of the steering wheel, either to the right or to the left, is less than one complete turn of the steering wheel when the front wheels are cramped for their full amount.

I preferably make the removable sleeve placed upon the rim, of a length, so that the end of the sleeve will indicate the complete movement of the steering wheel in order that graduations disposed upon the rim adjacent the end of the sleeve may indicate the position of the complete cramping of the front wheels. The graduations indicate complete cramping of the front wheels by the turning of the steering wheel. This therefore gives me a steering wheel having three points indicated thereupon, the central point being that of indicating the position of the front wheels relative to the longitudinal center line of the vehicle, the other two indicating the complete cramping of the front wheels, either to the right or to the left and the degrees of cramping less than the full movement of the steering wheel that is attainable.

With these and incidental objects in view, the invention consists in certain novel features of construction and combination of parts, the essential elements of which are set forth in the appended claim, and a preferred form of embodiment of which is hereinafter shown with reference in the drawing which accompanies and forms a part of this specification.

In the drawing.

Like reference characters refer to like parts throughout the several views.

Figure 1:
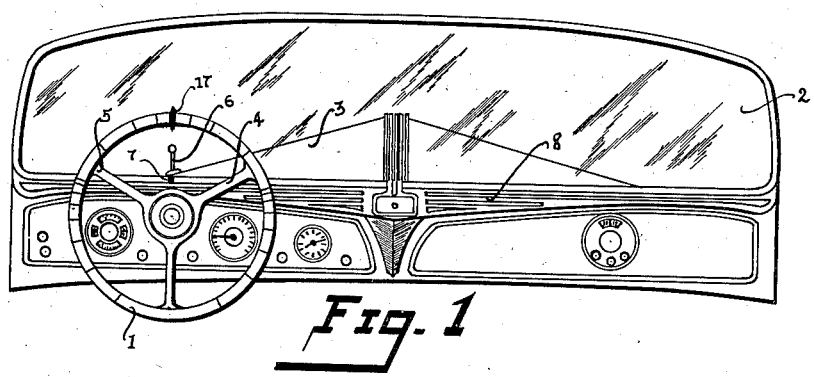
Fig. 1 is a plan view of the steering wheel and a front view of the cowl and of the windshield of the vehicle. In this view an indicator is shown upon the radiator shell of the vehicle and at the front end of the vehicle.
Figure 2:
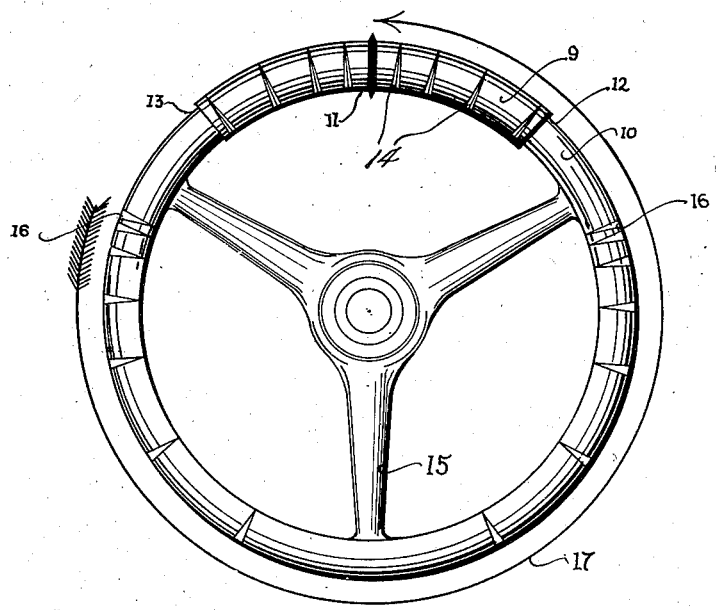
Fig. 2 is a plan view of the steering wheel illustrating the shield that is secured to the rim of the steering wheel of the vehicle.

I have here shown my device in place upon the steering wheel of a motor vehicle. The steering wheel is illustrated at 1, the windshield at 2 and the hood of the vehicle at 3. The steering wheel is of the three-spoke type. When the front wheels are parallel to the longitudinal axis of the vehicle, the spokes 4 and 5 are spaced equally from the vertical to leave a clear field between the spokes to permit a short driver to look between the spokes and below the rim of the steering wheel.

I place an indicator 6 upon the front of the vehicle and preferably upon the jacket or cover of the radiator. The position of the indicator 6 is so placed as to be in the normal line of vision of the driver of the vehicle and spaced apart from the longitudinal center line of the vehicle so that the line of vision of the eye of the driver relative to that of the indicator 6 will be parallel to the longitudinal axis of the vehicle.

I place a spot or line 7 upon the windshield or upon the cowl 8 of the vehicle with the line or spot 7 being in the line of vision between the eye of the driver and the indicator 6.

I place a removable shield 9 upon the rim 10 of the steering wheel. The shield 9 has a graduation 11 disposed midway its ends 12 and 13. Graduations are disposed at each side of the central graduation 11. The graduations 14 that are disposed at each side of the central graduation 11 are spaced apart from the central graduation and from each other. I preferably increase the spacings of the graduations uniformly from the central graduation 11 toward each end of the shield 9.

In driving the vehicle in a forward or in a reverse direction, in a straight line, the spoke 15 of the steering wheel is in a vertical position. Graduations are disposed upon the steering wheel and at each side of the spoke 15 and uniformly decrease in their spaced relation from the spoke along the rim of the steering wheel. When the steering wheel is fully turned the graduations 16 will be at the high point on the steering wheel and in the normal line of vision of the driver and a line with the indicator 6 and with the line 7. This will be true, whether the steering wheel is fully turned to the right or to the left. An arrow 17 indicates the full cramped position of the steering wheel and the front wheels, or the degree nearing the full cramped position.

While the form of mechanism herein shown and described is admirably adapted to fulfill the objects primarily seated, it is to be understood that it is not intended to confine the invention to the embodiment herein shown and described, as it is susceptible of embodiment in various forms, all coming within the scope of the claim which follows.

What I claim is:

In a device of the class described, in combination with a motor vehicle having instrumentalities disposed in the line of vision of the driver of the vehicle and disposed upon the front end of the vehicle and between the front end of the vehicle and the steering wheel, comprising a graduated shield removably secured to the rim of the steering wheel with the center of the shield being placed at the high point of the steering wheel when the vehicle is being driven in a straight line either in a forward direction or in a reverse direction with graduations being disposed at each side of the central portion of the shield and uniformly increasing in spaced relation relative to each other and graduations disposed upon the rim of the steering wheel uniformly decreasing in spaced relation from a point opposite to that of the central portion of the shield disposed upon the rim of the steering wheel and said graduations disposed upon the steering wheel ending at the high point of the steering wheel when the steering wheel is cramped to full cramped position and when turned either to the right or to the left.

PAUL D. KEMP.